(12) United States Patent
Stefanovic et al.

(10) Patent No.: US 9,589,191 B2
(45) Date of Patent: Mar. 7, 2017

(54) METHOD FOR EVALUATING A PLURALITY OF TIME-OFFSET PICTURES, DEVICE FOR EVALUATING PICTURES, AND MONITORING SYSTEM

(75) Inventors: Marko Stefanovic, Berlin (DE); Rolf-Stephan Badura, Berlin (DE); Jan Karsch, Berlin (DE)

(73) Assignee: Hella KGAA Hueck & Co., Lippstadt (DE)

( * ) Notice: Subject to any disclaimer, the term of this patent is extended or adjusted under 35 U.S.C. 154(b) by 174 days.

(21) Appl. No.: 14/000,107

(22) PCT Filed: Feb. 17, 2012

(86) PCT No.: PCT/EP2012/052818
§ 371 (c)(1),
(2), (4) Date: Oct. 22, 2013

(87) PCT Pub. No.: WO2012/110654
PCT Pub. Date: Aug. 23, 2012

(65) Prior Publication Data
US 2014/0037141 A1    Feb. 6, 2014

(30) Foreign Application Priority Data
Feb. 18, 2011    (DE) .................. 10 2011 011 931

(51) Int. Cl.
G06K 9/32        (2006.01)
G06K 9/00        (2006.01)
(Continued)

(52) U.S. Cl.
CPC ............ *G06K 9/00771* (2013.01); *G06T 7/20* (2013.01); *G08G 1/0116* (2013.01);
(Continued)

(58) Field of Classification Search
None
See application file for complete search history.

(56) References Cited

U.S. PATENT DOCUMENTS 6,185,314 B1 *   2/2001   Crabtree ............... G01S 3/7865
                                                                348/169
7,606,425 B2 *  10/2009   Bazakos ............ G06K 9/00335
                                                                348/143
(Continued)

FOREIGN PATENT DOCUMENTS

WO    WO-2008/008505 A2    1/2008
WO    WO-2009/079809 A1    7/2009

OTHER PUBLICATIONS

"International Application No. PCT/EP2012/052818, International Search Report and Written Opinion mailed Jun. 6, 2012", (Jun. 6, 2012), 16 pgs.

(Continued)

*Primary Examiner* — Chan Park
*Assistant Examiner* — Mai Tran
(74) *Attorney, Agent, or Firm* — Schwegman Lundberg & Woessner, P.A.

(57) ABSTRACT

The invention relates to a method for evaluating a plurality of chronologically staggered images, said method comprising the following steps:
  detecting a plurality of objects in a first image and storing each of the plurality of objects as tracks with a first capture time and/or a first capture location, preferably in a track list,
  detecting a plurality of objects in further images and identifying each of the detected objects as an object assigned to the respective stored track,
wherein the respective track is updated by the current position of the identified object and, in the respective
(Continued)

Figure 1:
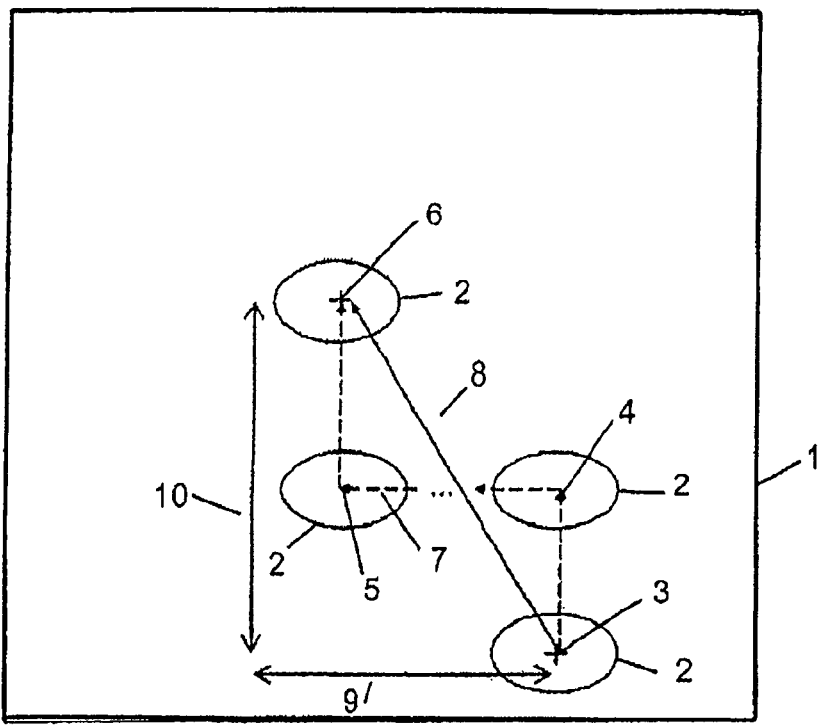

further images, objects detected for the first time are stored with assigned tracks, and wherein a covered path length, a distance and/or a time difference from the first capture time is determined as a capture period for each of the objects or tracks, wherein the path length, the distance and/or the capture period are compared with a respective predefined threshold value, and wherein the objects or tracks are classified according to the result of the comparison as objects or tracks to be taken into consideration or as objects or tracks not to be taken into consideration, wherein a number of stored tracks is determined for at least one of the images.

26 Claims, 4 Drawing Sheets

(51) Int. Cl.
  *G08G 1/01* (2006.01)
  *G06T 7/20* (2006.01)
  *G08B 13/196* (2006.01)

(52) U.S. Cl.
  CPC .. *G08G 1/0133* (2013.01); *G06T 2207/30241* (2013.01); *G08B 13/19608* (2013.01)

(56) References Cited

U.S. PATENT DOCUMENTS

| | | | | |
|---|---|---|---|---|
| 8,081,794 B2* | 12/2011 | Stiegler | | G06T 7/20 382/100 |
| 8,615,105 B1* | 12/2013 | Cheng | | G06K 9/00771 382/103 |
| 2002/0161780 A1* | 10/2002 | Dutta | | G06F 17/30017 |
| 2002/0191817 A1* | 12/2002 | Sato | | G07C 9/00158 382/118 |
| 2003/0075287 A1* | 4/2003 | Weik, III | | B60R 25/00 160/133 |
| 2005/0104960 A1 | 5/2005 | Han et al. | | |
| 2005/0146605 A1 | 7/2005 | Lipton et al. | | |
| 2005/0185822 A1* | 8/2005 | Slaski | | G06K 9/4604 382/103 |
| 2006/0187026 A1* | 8/2006 | Kochis | | G06Q 10/08 340/539.13 |
| 2007/0189585 A1* | 8/2007 | Sukegawa | | G06K 9/00221 382/118 |
| 2008/0166045 A1 | 7/2008 | Xu et al. | | |
| 2008/0231709 A1 | 9/2008 | Brown et al. | | |
| 2009/0110236 A1 | 4/2009 | Huang et al. | | |
| 2009/0116700 A1* | 5/2009 | Wakabayashi | | G06Q 20/3821 382/115 |
| 2010/0046797 A1 | 2/2010 | Strat et al. | | |
| 2010/0166259 A1* | 7/2010 | Otsu | | G06K 9/4609 382/103 |
| 2010/0195865 A1* | 8/2010 | Luff | | G06K 9/00771 382/100 |

OTHER PUBLICATIONS

Huttenlocher, Daniel P., et al., "Tracking Non-Rigid Objects in Complex Scenes", Computer Vision, 1993, Proceedings, Fourth Int'l Conference, Berlin, Germany, May 11-14, 1993, Los Alamitos, CA, USA, IEEE Computer Soci., (May 11, 1993), 93-101.

McKenna, Stephen J., et al., "Tracking Interacting People", Automatic Face and Gesture Recognition, 2000, Proceedings, Fourth IEEE Int'l Conference, Grenoble, France, Mar. 28-30, 2000, Los Alamitos, CA, IEEE Comput. Soc., US, (Mar. 28, 2000), 348-353.

Nascimento, Jacinto C., et al., "Trajectory Classification Using Switched Dynamical Hidden Markov Models", IEEE Transactions on Image Processing, vol. 19, No. 5, (May 1, 2010), 1338-1348.

Szwoch, Grzegorz, et al., "Identification of regions of interest in video for a traffic monitoring system", Proceedings of the 2008 1st International Conference on Information Technology, IT 2008, May 19-21, 2008, Gdansk, Poland, (May 18, 2008), 4 pgs.

\* cited by examiner

METHOD FOR EVALUATING A PLURALITY OF TIME-OFFSET PICTURES, DEVICE FOR EVALUATING PICTURES, AND MONITORING SYSTEM

PRIORITY CLAIM TO RELATED APPLICATIONS

This application is a national stage application under 35 U.S.C. §371 of PCT/EP2012/052818, filed Feb. 17, 2012, and published as WO 2012/110654 A1 on Aug. 23, 2012, which claims priority to German Application No. 10 2011 011 931.0, filed Feb. 18, 2011, which applications and publication are incorporated by reference as if reproduced herein and made a part hereof in their entirety, and the benefit of priority of each of which is claimed herein.

The invention relates to a method for evaluating a plurality of staggered images.

According to the prior art, it is known to examine chronologically staggered images for objects contained in the images. Objects found in chronologically later images are identified here as objects from chronologically earlier images in accordance with plausibility criteria, that is to say for example in accordance with their shape and their current position. It is indeed possible to reliably identify objects in chronologically later images as objects known from the chronologically earlier images by means of methods of this type according to the prior art, however there is the problem that additional objects are often identified incorrectly.

For example, sensor noise or the like can be detected as an additional object. In addition, in many applications only specific objects are to be detected. For example, in the case of surveillance images, the images are generally only to be examined for individuals identifiable therein.

Furthermore, there is the need to extract further information from the images.

One object of the invention is to create a method for evaluating a plurality of chronologically staggered images that enables objects to be captured and provides the user with additional information concerning the detected objects, whereby a reliable determination of the objects to be taken into account is ensured. A further object of the invention is to allow a user to carry out a data evaluation that is as comprehensive as possible.

This object is achieved by a method according to Claim 1, a device according to Claim 24 and a surveillance system according to Claim 25. Advantageous developments and embodiments are disclosed by the features in the dependent claims.

In accordance with the method according to the invention, a plurality of objects are first detected in a first image. The objects are each stored as tracks with a first capture time and/or a first capture location of the respective object. In particular, the tracks can be stored in a track list. In this case, an initiation of a parameter that specifies the time passed since the first capture (for example specified in the number of images recorded since the first capture) is also to be considered a storing of a capture time.

A plurality of objects in further images are then detected, wherein a position of each object is determined in each case. The first image and/or the further images may also be arbitrarily shaped sub-regions or portions of images. The objects detected in the further images, provided these are objects that have already been stored in a track, are identified as the object assigned to the respective track. The respective track is then updated by the current position of the respective object. Objects detected for the first time in the respective image are each stored with an assigned track.

The positions can preferably be specified in Cartesian coordinates in a right-handed coordinate system, wherein two objects may also have the same position. Centimeters can be used as a unit. The coordinate origin can preferably be set by a user. A unique object ID can preferably be assigned to each object.

The method can be used in particular for counting people and/or for capturing images of people. The majority of objects or all objects may particularly preferably be people.

In an embodiment of the method, a number of stored tracks is determined and preferably output for at least one of the images. This is particularly advantageous for example in the field of retail surveillance, since statistics concerning customer volume can therefore be established in a simple manner. Counting the objects to be taken into consideration also has advantages in many other fields, however. For example, a reliable and quick determination of the traffic volume is possible in the case of traffic surveillance cameras. The method is also advantageous in the case of luggage surveillance.

The images evaluated with the method are preferably images actually recorded. The objects captured in the images and their positions therefore correspond to objects and positions actually present. The method can be executed by a program running on a computer or also by a hardware designed specifically for the method. It is not the program as such however, but the technical method that is claimed.

In a preferred embodiment, a list of objects is stored and is output, at least in part, via an interface. An at least partial output means that the output list may contain fewer objects and/or less information assigned to the objects compared to the stored list. The output list can be used for various purposes.

For example, the user can count a specific line of crossing tracks with the aid of the output list. For a plurality of different lines, the objects or tracks crossing the respective line may also be counted separately.

Furthermore, the user of the method or of the device for evaluating images can use the output list to identify, independently of this device, tracks reentering a sub-region or ROI of the image after leaving the respective sub-region (or ROI). The output list can also be used to evaluate, by means of a separate device, the number of tracks arranged in a specific image region or also to analyse the arrangement of the tracks in terms of an interrelation thereof (for example whether a plurality of tracks form a queue). With regard to the aforementioned possibilities for use of the output list, it is preferable if a list is output more than once per second.

In addition, the output list can be used for statistical applications, such as the creation of heat maps, that it to say the capturing of where tracks or objects primarily reside and the ways in which they normally move. Further statistical applications include the creation of statistics for average residence period or the average length of queues. For these applications of the list, a less frequent output, for example approximately once per second or less frequently than once per second, is sufficient.

Depending on requirements, a list of stored tracks can be issued continuously for each recorded frame or each image, in predefined time intervals, or sporadically only as required. It is also possible to output the same list or differently filtered lists to a number of users at the same time.

Retrievals of lists by various users or clients preferably do not influence/disturb one another in this case.

The list can be formed for example as a list of objects currently contained in the image, that is to say the objects may correspond to the track list. The list then preferably contains for each object the current location at which the object is located, and particularly preferably a movement vector, which indicates the direction in which and the speed at which the object moves or the speed at which and the direction in which the respective object has moved in a past time domain, for example the last second, and/or past time domains. In particular, the movement vector can be determined by continuous calculation by means of a Kalman filter. The movement vectors may preferably be two-dimensional, that is to say a height or height change is not taken into consideration for the determination of the movement vectors. In addition, the list contains time information. Depending on the embodiment, each object can be assigned a time at which it was last captured, wherein this time is contained in the list, for example in form of an attribute of the object. This is expedient in particular in embodiments in which objects are then only removed from the track list when it has been ascertained that they have moved out from the image region or when they have no longer been captured for a predefined minimum time. In order to ascertain whether the object has moved out from the image region, it is possible to estimate on the basis of the last determined movement vector whether the object has likely left the image region. If an object is no longer captured over an excessively long time, an estimation as to where the respective object is located is preferably forsaken, wherein the object can then be removed from the track list. Alternatively, a single timestamp can be assigned to the output track list. Irrespective of whether time information (in particular a timestamp) is assigned separately to each individual object or whether a time is assigned to the track list as a whole, a time can be retrieved from an external information source for the generation of time information.

The output list may also be formed as a list of objects that have left the image region (or an ROI in the image region). For each object, the list preferably contains an entry location into the image region, an exit location from the image region, an entry time into the image region, a residence period in the image region, an exit time from the image region, and/or a last movement vector of the object is contained in the list. The list preferably does not contain all, but only some, of the specified information, however. In particular, it is advantageous if the list only contains two of the following details per object: entry time, residence period, and exit time. In particular, the list may contain the entry time or exit time in combination with the residence period in frames. Due to the detail of the residence period in frames, it is ensured that a residence period remains specified correctly, in the event of changes made with regard to daylight saving time (summer/winter time) between the moment of entry and the moment of exit. Since the third detail can then be calculated from the two other details (that is to say the entry time and the residence period or the exit time and the residence period), it is therefore redundant. Alternatively, the entry time, the exit time and the residence period (preferably in frames) can also be contained in the list, however. A plausibility check is then possible via the redundancy.

The list can also be formed as a mixed list, in which both objects that have left the image region and objects that have not yet left the image region are contained. In the case of a mixed list of this type, each object is assigned a piece of information, preferably in the form of an attribute, concerning whether the object is a current object or whether the object has already left the image region.

In a particularly preferred embodiment, both a list of objects contained currently in the image (that is to say a track list) and a list of the objects that have left the image region are stored. As soon as an object leaves the image region, that is to say the capture region, (that is to say either as soon as a departure from the image region is conclusive either on the basis of its movement vector and its location in an image in combination with the lack of renewed capture in the next image, or as soon as the object has no longer been detected over a predefined period of time), such that tracking is no longer possible, it is shifted from the track list into the list of objects that have left the image region (also referred to as a list of historical objects). An object removed from the track list is preferably no longer followed and accordingly can no longer be recognised. If the object later re-enters the image region, it is assessed as a new object, that is to say the old (identical) object remains contained in the list of historical objects and a new object is introduced into the track list.

In a preferred embodiment, a list of objects that has been filtered out from the track list and/or the list of historical objects is output.

For example, it is possible to filter for objects that have been initially captured in a specific region, for example a queue at a point of sale or a specific traffic lane.

It is also possible to filter for objects that were initially captured in a specific region before the exit from the image or ROI. For example, only tracks that have left a store after visiting the point of sale can thus be taken into consideration.

When carrying out a filtering process in a manner dependent on first capture location or exit location, the region in which the objects were last captured or must have been last captured in order to be output can preferably be input by a user. To this end, the user can select, for example, a polygon (preferably at least one square) in an image.

When inputting the first capture location or exit location for the filtering process and also in the event of any other inputs in which the user manually selects an image region, the coordinates at which a mouse cursor is located for selection of the image region is displayed to the user. Due to such a display of the coordinates in a rollover, the user can particularly easily comprehend which region he has just selected.

An output of the list can be controlled for example via trigger conditions that can be set by the user. For example, the list can be output at regular intervals.

It is also possible to then output a list of objects whenever an object or a predefined number of objects has been shifted from the track list into the list of historical objects. In this case, a list of all objects shifted since the last output of the list can be output in particular.

In an advantageous embodiment, additional attributes, for example object categories or zones in which the object was initially captured, are assigned to the objects in the list. A movement attribute, which specifies whether the object is a stationary object, a slow object, or a quick object, can be assigned as an additional attribute to the object. The list of the current objects (track list) and/or the list of historical objects can alternatively also be sub-divided in accordance with the corresponding property (that is to say for example the object category), such that information concerning the corresponding attribute is present for each object via the sub-division of the list, without the need for storage as a separate attribute of the object. This is helpful in particular in the event of an application of the method for traffic surveillance. For example, by means of the detail concerning the object category, it is possible to ascertain whether the object is a pedestrian, cyclist, passenger car or a lorry.

An output of the list and/or trigger conditions which may automatically trigger the output of the list can be controlled, preferably via an HMI and/or an MAPI. The list is preferably output exclusively via the MAPI, since a display of the lists by the HMI or user interface is not normally expedient due to space. The output of lists can therefore preferably be controlled merely via the HMI.

In a further preferred embodiment, it is initially checked whether a specific licence file is present, and lists can only be output if the licence file is present. If there is no licence file for the output of lists, only a reduced functional scope is available to the user, for example a counting of the objects in the list by means of the surveillance device itself. A surveillance system with a different functional scope can thus be produced at low cost. It is preferably indicated to a user of the surveillance device whether or not the licence file is present.

The track may preferably be output continuously or in accordance with a plurality of images or on the command of a user. For example, the residence period, an object number, and the entry location and exit location of all objects that have already left the image region (or an ROI in the image region) can be output. In addition, the aforementioned details can also be output for objects still present in the image region. The object or track ID, the location dependent on time, and the time and location of the entry and exit into and from the image region can also be output for all objects. Further data, such as the residence period, movement patterns or the like, can be calculated from this data.

In accordance with the invention, a covered path length, a distance and/or a time difference from the first capture time is determined for each of the objects or tracks as a capture period of the respective object. The actual spatial distance (for example in 3D world coordinates) and/or the distance in the individual spatial directions (for example the distance in the horizontal x-direction and/or vertical z-direction or also in all three spatial coordinates) can be determined as the Euclidean distance. Similarly, a total path length and/or a path length in individual spatial directions can be determined.

The path length, the distance and/or the capture period (these properties are also referred to as qualities) are each then compared with a predefined threshold value. The respective object or the respective track is then classed as an object or track to be taken into consideration or as an object or track not to be taken into consideration. The fact as to whether the object or the track is classed as an object or track to be taken into consideration or as an object or track not to be taken into consideration depends on the result of the comparison of the path, the distance and/or the capture period with the respective predefined threshold values.

In an ideal world, the current fill level, that is to say the current number of objects to be taken into consideration, would be equal to the number of stored tracks in the track list. Due to sensor noise or interferences (objects in the image) however, there are generally more tracks than objects to be taken into consideration. Due to the comparison and the subsequent classification, criteria typical for people, such as the covering of a path and/or the residence for a predefined minimum residence period in the image region, are used in order to assess whether or not the object is an object to be taken into consideration. Incorrect identifications can therefore be ruled out practically completely.

The object is particularly preferably classified as an object to be taken into consideration if one of the above-mentioned variables (covered path, distance from the first capture location, capture period), if all of the above-mentioned variables, and/or if a number of the above-mentioned variables (either a minimum number of the mentioned variables or a specific number of the mentioned variables) is/are greater than the corresponding threshold value. Since it is checked that the object has been detected at least for a predefined time, has covered at least a predefined path, and is arranged at least at a predefined distance from the first capture location, errors, for example caused by sensor noise or stationary items incorrectly identified as objects, can be ruled out particularly effectively.

Depending on the embodiment of the method, it may be advantageous if only objects in a specific sub-region of the images are classified as tracks to be taken into consideration or if only tracks assigned an object arranged in the sub-region are taken into consideration when determining the number of stored tracks. It is also possible to dispense with a storing of the objects having a first capture time and first capture location that have not been detected at least once in the sub-region. Since only a certain sub-region of the images is consulted, the evaluation can be limited to a region relevant for a user. If, for example, a sales stand is monitored by means of a camera, the region directly surrounding the sales stand can be defined as a sub-region (also referred to as an ROI, region of interest, or as a surveillance region).

A number of ROIs can also be specified, wherein, for each of the ROIs, a number of objects or stored tracks to be taken into consideration can be determined and/or output independently of one another. The ROIs may each be shaped arbitrarily. The shape of the ROI or of the ROIs may preferably be ascertained by a user. In particular, the ROI can be defined by a polygon course surrounding the respective ROI. In embodiments in which a number of ROIs are specified, each object or track can be assigned a zone or an ROI to which the respective track is assigned. In addition, a track list can also be stored separately for each ROI.

In a further embodiment of the invention, an exit time of the respective object from the plurality of images and/or the sub-region is determined and stored. In this case, the time at which the respective object was last detected in the images or in the sub-region of the images is detected as the exit time.

The exit time and first capture time or a time difference calculated therefrom can be output to a user or, for further data processing, to a computer. This is advantageous in particular if residence periods of people in the image region or in the sub-region are to be determined. Information of this type is of interest in order to optimise sales stands, department stores, or the like. A determination and output of the exit time or of the time difference between the first capture time and exit time can also be considered to be advantageous per se, that is to say without a determination of the number of stored tracks. Alternatively to a storing of the exit time and of the first capture time, the exit time (for example in the form of date and timestamp) or first capture time and the residence period (for example in seconds) can also be stored. The respective other value can then be calculated from these two values. As described before, the storing of the first capture time or exit time and also the residence period (in frames) is particularly preferred, since the data then cannot be falsified, even in the event of changes made with regard to daylight saving time.

For example, images of an image capture system (in this case this may be a single camera, a stereo camera, TOF camera or any other camera, for example. Even radar capture systems or ultrasound capture systems can be used) can be evaluated as images, preferably in real time. Due to the evaluation real time, that is to say during the recording of the images, a user can retrieve results of the surveillance operations at any time and can respond thereto accordingly. The correct execution of the method can thus also be checked by a user at any time.

In order to enable an optimisation of the method at any time, the predefined threshold values are changed, during the detection of at least one object, either by a user or automatically (for example by an optimisation algorithm provided for this purpose). If, for example, it turns out that people passing through the image region leave the image region too quickly, such that they are ascertained as an object having an age below the corresponding threshold value, the threshold value can be reduced accordingly. This change made by the user can be implemented for example via a web interface.

In order to avoid a strong fluctuation of the evaluation results, a number, averaged over time, of the objects or tracks to be taken into consideration and/or a time difference, averaged over time, between the first capture time and the exit time can be determined. In many cases, details averaged in this way may be much more meaningful than statements concerning an individual camera image. As an example, reference is again made to the surveillance of stores, where a storeowner is not interested in the number of customers present at specifically one moment in time, but in an average number of customers and an average residence period.

In a further embodiment, a plurality of objects or tracks are stored, wherein, once a predefined object number or track number has been reached and/or once a predefined memory demand has been reached, an oldest object is overwritten. As a result, if the number of stored objects is limited by the available memory space, it is then still possible to capture new objects. Objects that are still within the image region and/or sub-region can particularly preferably be stored separately from objects that have already left the image region and/or sub-region. In embodiments of this type, only objects that have already left the image region and/or sub-region are overwritten. The objects or tracks that have left the image region and/or sub-region are preferably output at regular intervals and/or upon request. The output objects can then be deleted from the previous memory location.

A particularly reliable classification of the objects is possible if both the path length and also the distance and the capture period are determined and compared with the respective threshold values. The object is then classified under consideration of all of these criteria. The object is particularly preferably then only classified as an object to be taken into consideration if the path length and also the distance and the capture period are above the threshold value.

Furthermore, the classification preferably depends on a history of the object or track. A track that was once classified as a track to be taken into consideration is then, independently of the position present at that time, also classified in the later images as a track to be taken into consideration.

In an embodiment, a list of objects may be used to establish objects crossing counting lines, to assess re-entrants into a sub-region of the images, to separately assess the object numbers in a number of subregions of the images, to count people standing in queues, to create heat maps, and/or to create statistics concerning residence period.

In an embodiment, a plurality of lists may be used together to establish objects crossing counting lines, to assess re-entrants into a subregion of the images, to separately evaluate the object numbers in a plurality of subregions of the images, to count people standing in queues, to create heat maps, and/or to create statistics concerning residence period.

In an embodiment, the list of objects may be formed as a track list. The output track list may contain information concerning the time of the first capture of the objects, the first capture location, and/or the time at which the object was last captured.

In an embodiment, the list of objects may be formed as a list of objects that have left an image region, wherein, for each object in the list, an entry location into the image region, an exit location from the image region, an entry time into the image region, a residence period in the image region, an exit time from the image region and/or a last movement vector of the object may be contained in the list.

In an embodiment, the objects in the list may be assigned a further attribute, for example an object category or object zone, and/or the list may be sub-divided into sub-lists according to a further attribute.

In an embodiment, for the objects or tracks, a covered path length, a distance, and/or a time difference from the first capture time may be determined as a capture period, wherein the path length, the distance and/or the capture period is/are compared with a respective predefined threshold value, and wherein the objects or tracks are classified according to the result of the comparison as objects or tracks to be taken into consideration or as objects or tracks not to be taken into consideration.

In an embodiment, the predefined threshold values may be automatically changed by a user and/or by an optimization algorithm before or during the detection of at least one object.

In an embodiment, the tacks may each only be taken into consideration when determining the number of tracks and/or only classified as tracks to be taken into consideration if the respective corresponding object is arranged in a predefined sub-region of the images.

In an embodiment, an exit time from the plurality of images and/or the sub-region may be determined and stored for each of the objects.

In an embodiment, the first capture time and the exit time and/or a time difference between the first capture time and exit time may be output.

In an embodiment, a number, averaged over time, of tracks and/or a time difference, averaged over time, between the first capture time and exit time may be determined.

In an embodiment, a plurality of objects may be stored, wherein, once a predefined number of objects has been reached and/or once a predefined memory demand has been reached, an oldest object is overwritten.

Figure 2:
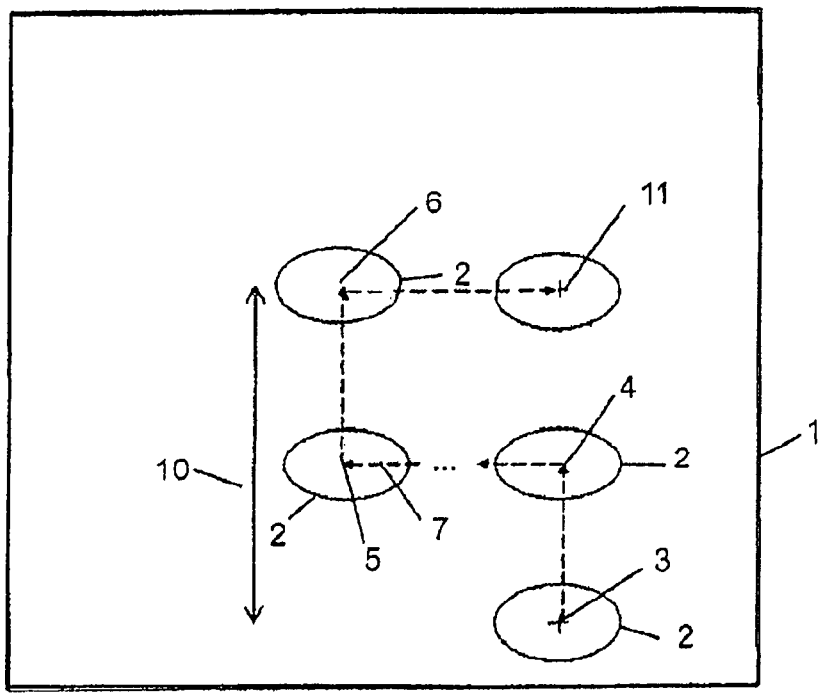
Figure 3:
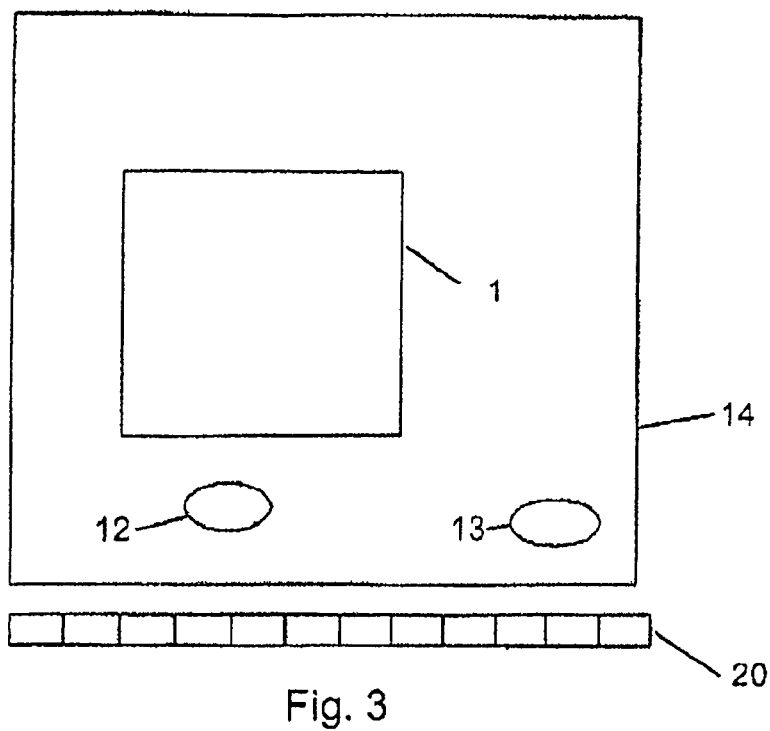
Figure 4:
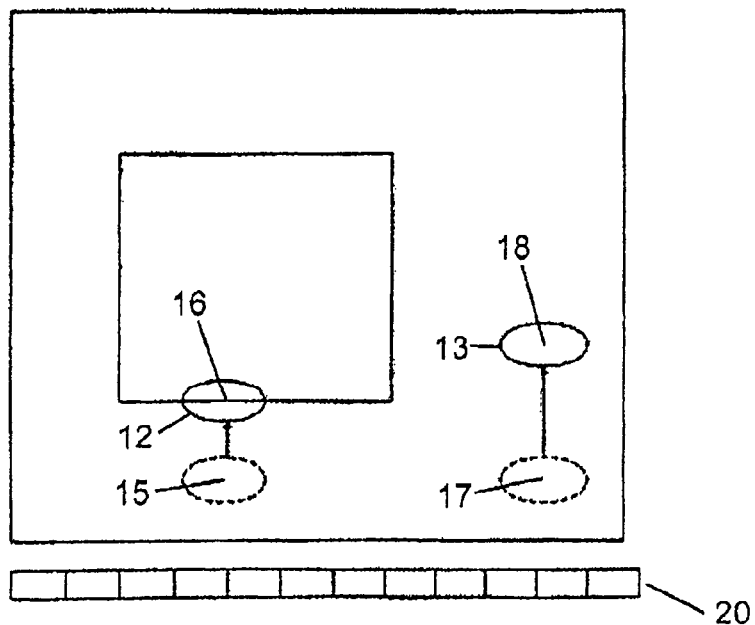
Figure 5:
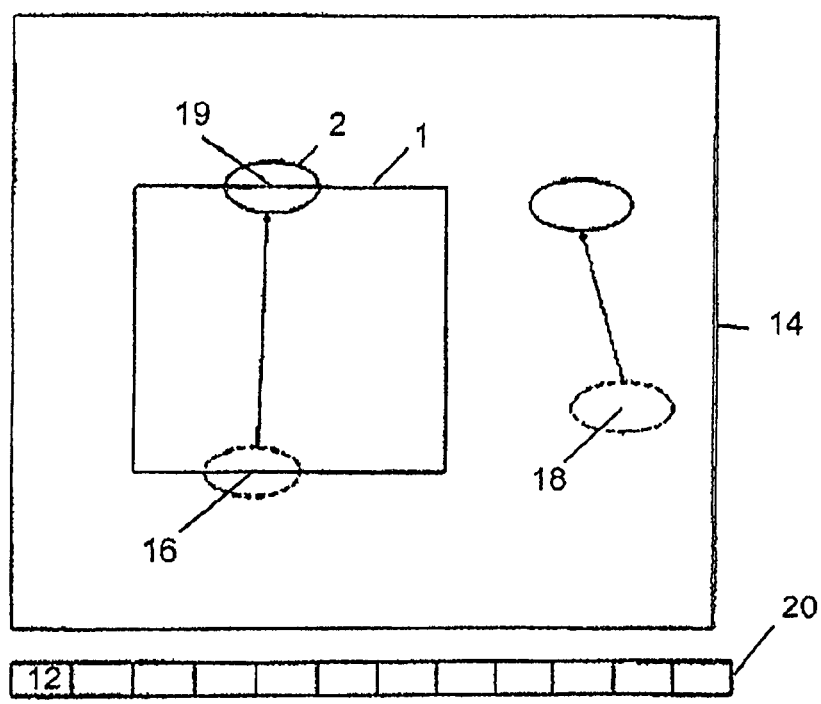
Figure 6:
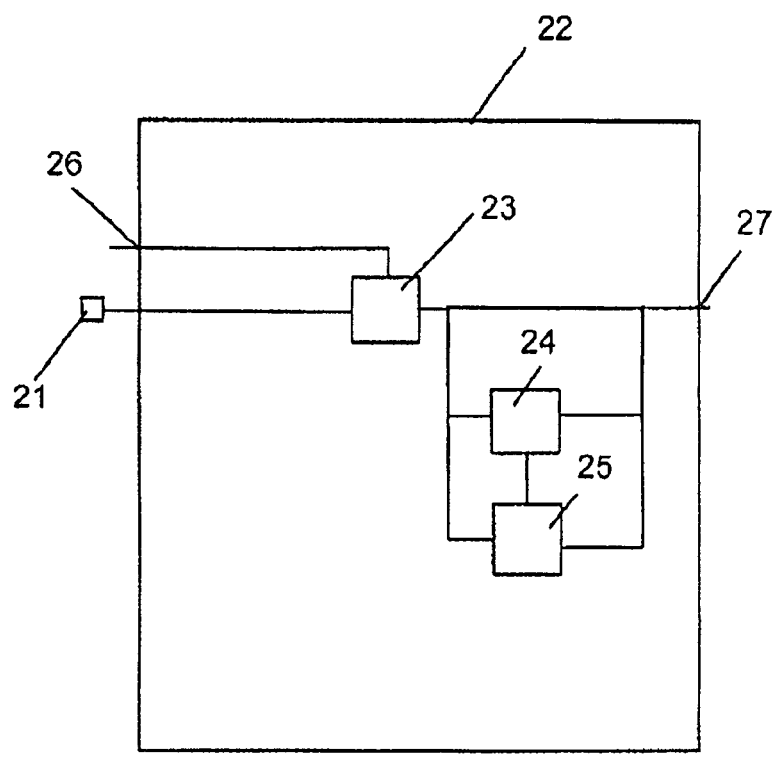

Exemplary embodiments of the invention will be explained in greater detail hereinafter on the basis of the figures, in which:

FIG. 1 shows a schematic illustration illustrating a first embodiment of the method according to the invention, FIG. 2 shows a schematic illustration as in FIG. 1 at a later moment in time of the method compared to that illustrated in FIG. 1, FIG. 3 shows a schematic illustration illustrating a further embodiment of the method according to the invention, FIG. 4 shows a schematic illustration as in FIG. 3 at a later moment in time of the method, FIG. 5 shows a schematic illustration as in FIGS. 3 and 4 at an even later moment in time of the method, and FIG. 6 shows a schematic illustration of an embodiment of a surveillance system.

A first embodiment of the method according to the invention, in which a plurality of chronologically staggered images recorded by a surveillance camera are evaluated, will be illustrated on the basis of FIG. 1. In FIG. 1, a region of interest (ROI, also referred to as a surveillance region) 1 of an image of a surveillance camera is illustrated. In the ROI, an object 2 (in this case the object may be a person or a piece of luggage, for example) is displayed in a number of positions 3, 4, 5, 6. The fact that the object 2 in FIG. 1 is illustrated in a number of positions serves merely for clarification.

In fact, the object 2 is arranged only in one position in each individual image of the surveillance camera. Accordingly, the object 2 is in each case located in one of the locations 3, 4, 5, 6 in chronologically staggered images of the surveillance camera. On the whole, between the position 3 and the position 6, the object 2 covers the path 7 indicated by the dashed arrows. A Euclidian distance between the current position 6 of the object 2 and the starting position 3 is indicated by the arrow 8. The X-component and Z-component of the distance are illustrated by the parts 9 and 10 respectively.

In accordance with the exemplary embodiment of the method according to the invention, the object 2 is initially captured at a position 3. In this case, the object 2 is stored as a track together with the starting position and the starting time of the object. The starting time can be stored for example by assigning the object an "object age" parameter, this parameter being set to zero at the starting time and being increased with each subsequent camera image or each frame in which the object 2 is ascertained.

Subsequent camera images are also each examined for objects in accordance with the method. Here, in each one of the subsequent camera images, an object is detected at the positions 4, 5 or 6. On the basis of plausibility criteria, such as the shape of the object, the object ascertained at the position 4, 5 or 6 is identified as the object 2 which was already discovered beforehand at the starting position 3. After the detection of the object in each of the subsequent images, an age of the object 2, a distance from the starting position 3 of the object 2, and also a path 7 covered proceeding from the starting position 3 is determined in each of the subsequent images. In FIG. 1, this is indicated by way of example for the position 6.

The covered path 7, the Euclidian distance 8 (for example in 3D world coordinates), and the object age (these properties are also referred to as "qualities" of the object) are each compared with a threshold value. Additionally, the X-component 9 and the Z-component 10 of the distance and the path are also compared with corresponding threshold values. If the path, the distance, and the object age are each above the threshold value, the object is classified as an object to be taken into consideration. Otherwise, it should not be ruled out that the object is a capture error. In these cases, the object is therefore not taken into consideration.

Even though only one object 2 is indicated in FIG. 1, a plurality of different objects can of course be detected at the same time in the same images and stored as tracks. For each of the objects, it is then determined whether these are objects to be taken into consideration or possible detection errors. The number of objects that have been classified as objects or tracks to be taken into consideration is calculated for each image and output to a user. For example, a customer volume within the ROI 1 can thus be determined.

It is to be illustrated on the basis of FIG. 2 that a distance in the X-direction does not always have to be identical to the covered path in the corresponding direction. If the object 2, starting from the position 6, moves back toward the starting position 3 with respect to its X-direction, such that is reaches the position 11, a distance between the current position 11 and the starting position 3 in the X-direction is zero. A path covered in the X-direction has increased however starting from the position 6, since the paths covered between the individual images are added together as sums.

In FIGS. 3 to 5, a further exemplary embodiment of the method according to the invention is illustrated, wherein, in the scope of this exemplary embodiment, a residence period of the objects that have been classified as objects to be taken into consideration is determined. In this case, FIG. 3 illustrates the situation that two objects 12 and 13 are arranged in the image region 14 of a surveillance camera (for example a stereo camera or TOF camera). Both objects 12 and 13 are outside the surveillance region ROI 1, however. Accordingly, an object position of the two objects 12 and 13 is not determined more accurately and no data is stored concerning the objects. A first capture moment also has not yet been assigned.

In FIG. 4, it is illustrated that the object 12 moves from its original position 15 outside the ROI 1 to a position 16 within the ROI. As soon as the object 12 is detected within the ROI 1, a first capture position, that is to say a position in which the object has been detected for the first time within the ROI 1, is stored in a track list. It has proven to be expedient, for example for counting people or capturing images of people, for the track list to be designed in such a way that it can record up to 8 objects per square meter of the area in the image or ROI. For other applications, another number of objects per square meter of area may also be sensible. This number of memory spaces is normally large enough to store all current objects, whereas on the other hand the memory is not unnecessarily large and therefore costly. In addition, a first capture time is defined. If the object 12 now moves within the ROI, the object is classified as an object to be taken into consideration or as a possible sensor error, as has been explained in conjunction with FIGS. 1 and 2. The object 13 at the same time moves from a position 17 to a position 18, wherein both positions are arranged outside the ROI 1. Accordingly, no data is stored concerning the object 13.

As illustrated in FIG. 5, the objects 12 and 13 then continue to move. The object 13 leaves the ROI 1 (also referred to as a surveillance region) at an exit position 19. Once it has left the ROI, the object is stored together with its first capture location and its exit location and also the overall time over which it has resided in the ROI 1. For example, this data can be stored at a separate memory location separately from the information concerning the objects currently located in the ROI. In the present example, the aforementioned data concerning the objects that have left the ROI is stored in a circular buffer 20. If the circular buffer 20 is full when an object leaves the ROI 1 and is therefore to be stored in the circular buffer 20, an object in the circular buffer 20 that has been stored the longest is overwritten. The number of overwritten objects is also stored.

The illustrated method can be controlled by a user of a surveillance camera system, for example via a web interface. During the method, the threshold values for the capture time, the distance, or the covered path can be changed at any time by the user. The ROI 1 can also be adapted at any time by the user. The data stored in the circular buffer can be retrieved at any time via the web interface. In particular, an automatic retrieval of the data stored in the circular buffer is possible at predefined time intervals, which can be set by a user. After each interrogation of the circular buffer, the output data are deleted from the circular buffer in order to prevent said data being taken into consideration multiple times.

Any data established can of course also be processed statistically. For example, a residence period in the ROI, averaged over time, can thus be determined. An average number of objects that have been classified as objects to be taken into consideration can also be determined.

In this case, the use of a flowing mean value $G_{n+1}=a*F+(1-a)*G_n$ has proven to be particularly suitable. $G_{n+1}$ is in this case the averaged value at the moment in time of the image n+1, a is a parameter that is greater than 0 and smaller than 1, F is the current value in the image n+1, and $G_n$ is the averaged value for the image. Although the method has been explained above primarily based on surveillance cameras, it can in principle be applied to any chronologically offset images of an image region.

On the whole, the method can be used in a wide range of fields, for example customer surveillance for the purpose of sales optimisation, monitoring of a volume of traffic on roads, or monitoring of the volume of people at major events in order to improve safety.

It should be noted that a method as illustrated in FIGS. 3 to 5 can also be carried out in an alternative variant without a counting of objects or an establishment of an average residence period. In this alternative variant, the current objects are stored in a track list, as mentioned above. All objects that enter the ROI, such as the object 12, are stored in the track list. Should the number of objects currently contained in the ROI grow to an implausibly high value, an error signal can preferably be generated. As soon as the objects leave the ROI again (this can also be selected such that it comprises the entire image region), they are transferred from the track list into the circular buffer 20.

Each time an object leaves the ROI, the object (or a list of objects that have left the ROI) is simultaneously output via an interface. Additionally, it may also be requested from the circular buffer, that is to say the user may also output a list of all objects contained in the circular buffer.

In this embodiment, further functions, such as a counting of objects, can be implemented by a separate, user-specific device. Merely the track list and the list of objects that have left the ROI stored in the circular buffer 20 are thus output.

A surveillance system for carrying out the method is illustrated in FIG. 6. The surveillance system comprises a camera 21 and a device 22 for evaluating images. The surveillance system is suitable for determining the position coordinates of objects having a resolution of at least 30 cm.

The device 22 is connected via a data input 23 to the camera 21 and is designed to receive image data from the camera 21. The device 22 additionally comprises a control unit 23, a first memory 24 for storing the track list, and a circular buffer 25 for storing the list of historical objects (that is to say the objects that have left the image region or ROI). The memories 24 and 25 can be formed as physically separate memories or may also only be separated with regard to software. In addition, the memories 24 and 25 can be formed in such a way that they are automatically deleted when the surveillance system is restarted, or that the memories are automatically emptied in the unpowered state.

In addition, a flash memory (not illustrated) may be provided, in which data is stored that is also to be retained after a restart of the surveillance system. For example, configurations of the surveillance system can be stored in the flash memory.

The control unit is designed to identify and to track objects in images input by means of the camera 21. In addition, the control unit 23 can receive commands via an HMI. To this end, the control unit 23 is designed to output an HMI via the interface 26 and to receive data input via the HMI. For example, an ROI can be set via the HMI. In addition, the control unit 23 is connected to an MAPI 27, wherein commands can be transmitted to the control unit 23 via the MAPI 27, similarly to the manner in which they are transmitted by the HMI.

Objects identified in the images are stored in the memory 24 by the control unit 23. The control unit 23 is preferably designed to capture a movement of the objects and, for each object, to also store a respective movement vector in the memory 24. As soon as an object stored in the memory 24 leaves the ROI or the image region of the camera 21, the object is shifted from the memory 24 into the circular buffer 25. This may comprise, for example, approximately 100,000 memory spaces for objects. The number of memory spaces can preferably be adjustable for a user. In addition, the corresponding object is output via the MAPI 27.

It is also possible via the MAPI to read out all objects (either the objects stored in the memory 24 and the objects stored in the memory 25, or also just the objects stored in the memory 24 or 25) or a quantity of objects limited by filter criteria (for example specific capture times, locations or object categories). For example, all objects that have been captured between two events (for example an opening and a closing of a door) can be read out. In addition, it is possible to set an automatic output of the objects stored in the memories 24 and 25 or of a filtered selection of these objects at regular intervals (these can be selected by the user) via the MAPI or the HMI. Furthermore, it is possible to set a sectioning of lists that are longer than a specific length into a number of list parts, wherein these are then transferred in succession. This is then advantageous in particular if the list is too large to be transferred all at once.

In addition, the number format used (that is to say separation of the decimal points by means of a point or comma) and also the date format can be set by a user via the HMI or MAPI.

The invention claimed is:

1. A method for evaluating a plurality of chronologically offset images, said method comprising the following steps:
   detecting a plurality of objects in a first image and storing each of the plurality of objects as tracks with a first capture time and a first capture location,
   detecting a plurality of objects in further images and identifying each of the objects detected in the further images as an object assigned to the respective stored track, wherein the respective track is updated by the current position of the object identified as the object assigned to this track and, in the respective further images, objects detected for the first time are stored with assigned tracks,
   storing and outputting both a track list and a list of objects that have been assigned to one of the tracks and that have left an image region, wherein, for each of the objects in the list, the list contains at least one of the following: an entry time into the image region, a residence period in the image region and an exit time from the image region, wherein objects that have left the image region are shifted from the track list into the list of objects that have left an image region, and outputting a list filtered from the track list and/or a list filtered from the list of objects that have left an image region, wherein the filtering is based on an attribute of the objects.

2. The method according to claim 1, comprising determining a number of stored tracks for at least one of the images.

3. The method according to claim 1, comprising:
using the list to establish objects crossing counting lines, to assess re-entrants into a sub-region of the images, to separately assess the object numbers in a number of sub-regions of the images, to count people standing in queues, to create heat maps, and/or to create statistics concerning residence period.

4. The method according to claim 1, comprising outputting the list in a manner chronologically staggered with respect to the storing of said list.

5. The method according to claim 1, comprising outputting a plurality of lists in a chronologically staggered manner, wherein the plurality of lists are further processed together, in such a way that the lists are used together to establish objects crossing counting lines, to assess re-entrants into a sub-region of the images, to separately evaluate the object numbers in a plurality of sub-regions of the images, to count people standing in queues, to create heat maps, and/or to create statistics concerning residence period.

6. The method according to claim 1, comprising forming the list of objects as an output track list, wherein the output track list for each object specified in the list comprises information concerning a location at which the respective object is currently located, and wherein the output track list contains information concerning the time of the first capture of the objects, the first capture location, and/or the time at which the object was last captured.

7. The method according to claim 1, comprising forming the list as a list of objects that have left an image region, wherein, for each object in the list, an entry location into the image region, an exit location from the image region, and/or a last movement vector of the object is contained in the list.

8. The method according to claim 1, filtering out and outputting a list of the objects that were last shifted from the list of objects currently contained in the image into the list of objects that have left an image region.

9. The method according to claim 1, comprising outputting the list whenever a predefined trigger condition is met.

10. The method according to claim 1, comprising assigning the objects in the list a further attribute and/or subdividing the list into sub-lists according to a further attribute.

11. The method according to claim 1, comprising controlling an output of the list via an HMI or MAPI.

12. The method according to claim 1, comprising, for the objects or tracks, determining a covered path length, a distance, and/or a time difference from the first capture time as a capture period, wherein the path length, the distance and/or the capture period is/are compared with a respective predefined threshold value, and wherein the objects or tracks are classified according to the result of the comparison as either objects or tracks to be taken into consideration or as objects or tracks not to be taken into consideration.

13. The method according to claim 1, comprising automatically changing the predefined threshold values by a user and/or by an optimization algorithm before or during the detection of the at least one object.

14. The method according to claim 1, wherein the tracks are each then only taken into consideration when determining the number of tracks and/or are then only classified as tracks to be taken into consideration if the respective corresponding object is arranged in a predefined sub-region of the images.

15. The method according to claim 1, comprising outputting the specific number of tracks or objects continuously or in accordance with a plurality of images or upon the command of a user.

16. The method according to claim 1, comprising determining and storing an exit time from the plurality of images and/or the sub-region for each of the objects.

17. The method according to claim 14, comprising outputting the first capture time and the exit time and/or a time difference between the first capture time and exit time.

18. The method according to claim 1, comprising evaluating as images recorded images captured by an image capture system in real time.

19. The method according to claim 1, comprising determining a number, averaged over time, of tracks and/or a time difference, averaged over time, between the first capture time and exit time.

20. The method according to claim 1, wherein a plurality of objects are stored, wherein, once a predefined number of objects has been reached and/or once a predefined memory demand has been reached, an oldest object is overwritten.

21. The method according to claim 1, wherein the objects are people or items of luggage.

22. A system comprising a device for evaluating images, comprising an image processor circuit configured to:
detect a plurality of objects in a first image and storing each of the plurality of objects as tracks with a first capture time and a first capture location;
detect a plurality of objects in further images and identify each of the objects detected in the further images as an object assigned to the respective stored track, wherein the respective track is updated by the current position of the object identified as the object assigned to this track and, in the respective further images, objects detected for the first time are stored with assigned tracks;
store and output both a track list and a list of objects that have been assigned to one of the tracks and that have left an image region, wherein, for each of the objects in the list, the list contains at least one of the following: an entry time into the image region, a residence period in the image region and an exit time from the image region, wherein objects that have left the image region are shifted from the track list into the list of objects that have left an image region, and
output a list filtered from the track list and/or a list filtered from the list of objects that have left an image region, wherein the filtering is based on an attribute of the objects.

23. A surveillance system comprising at least one image capture system, and a device for evaluating images, comprising an image processor circuit configured to:
detect a plurality of objects in a first image and storing each of the plurality of objects as tracks with a first capture time and a first capture location;
detect a plurality of objects in further images and identify each of the objects detected in the further images as an object assigned to the respective stored track, wherein the respective track is updated by the current position of the object identified as the object assigned to this track and, in the respective further images, objects detected for the first time are stored with assigned tracks;

store and output both a track list and a list of objects that have been assigned to one of the tracks and that have left an image region, wherein, for each of the objects in the list, the list contains at least one of the following: an entry time into the image region, a residence period in the image region and an exit time from the image region, wherein objects that have left the image region are shifted from the track list into the list of objects that have left an image region, and output a list filtered from the track list and/or a list filtered from the list of objects that have left an image region, wherein the filtering is based on an attribute of the objects.

24. The method according to claim 1, wherein the attribute includes a capture location.

25. The method according to claim 1, wherein the attribute includes a capture time.

26. A method for evaluating a plurality of chronologically offset images, said method comprising the following steps:
  detecting a plurality of objects in a first image and storing each of the plurality of objects as tracks with a first capture time and a first capture location,
  detecting a plurality of objects in further images and identifying each of the objects detected in the further images as an object assigned to the respective stored track, wherein the respective track is updated by the current position of the object identified as the object assigned to this track and, in the respective further images, objects detected for the first time are stored with assigned tracks,
  storing and outputting a mixed list of objects that have been assigned to one of the tracks, the list containing objects that have not yet left an image region and objects that have left an image region, wherein, for each of the objects in the list, the list contains at least one of the following: an entry time into the image region, a residence period in the image region and an exit time from the image region, and wherein a piece of information is assigned to each of the objects in the list, said piece of information indicating whether the object has already left the image region or not and being adapted if the object leaves the image region, and
  outputting a list filtered from the mixed list, wherein the filtering is based on an attribute of the objects.

* * * * *